Sept. 23, 1952   R. B. POND   2,611,207

FISHING PLUG

Filed April 17, 1947

INVENTOR.
Robert B. Pond
BY Nathaniel Frucht
ATTORNEY

Patented Sept. 23, 1952

2,611,207

UNITED STATES PATENT OFFICE 2,611,207

FISHING PLUG

Robert B. Pond, Attleboro, Mass.

Application April 17, 1947, Serial No. 742,171

1 Claim. (Cl. 43—42.36)

My invention relates to improvements in fishing plugs and lures particularly adapted for use with powerful game fish such as striped bass. Striped bass, a sea fish, usually feeds near the shore and is a big, powerful, active, gamey fish of substantial weight, varying from 8–40 pounds, providing an exciting catch for the surf-casting fisherman.

An object of my invention is to provide a fishing plug which is primarily adapted for use with striped bass and for this purpose I have so designed my plug as to present the optimum amount of appeal and allure to the fish, at the same time being of sufficiently rugged construction to land the fish.

Fishing for striped bass requires a lot of watching, listening and practicing. The striped bass, being an active and powerful fish, when hungry, searches for fish with much power and gusto. The habit of the striped bass is to sneak up quickly on the bait and with a powerful jump out of water land on top of it to stun and conquer it before eating it. I have discovered that it is particularly attracted towarded wounded or injured smaller fish, and when it so jumps to stun its prey, it makes a large splash in the water, with the emission of air bubbles, causing a popping sound.

The fact that one bass has found food in the neighborhood excites all the other bass in the neighborhood to be particularly on the lookout for more food and I have discovered that if the bass hear what they think is another bass landing food, it attracts and stirs up the other striped bass to be on the lookout for food in the same vicinity.

I have, therefore, so designed my improved plug or lure that it will be most attractive to the striped bass and I have provided a lure which is of elongated generally cylindrical fish simulating shape, preferably having a nose and rear end in simulation of a fish, which will function as retrieved so that the rear end of the plug will always remain above the water and the plug will axially wiggle or pivot while partially rotating as it moves through the water in simulation of an injured fish and so that when a sharp pull is made on the line the plug may jump out of the water, temporarily turn over to create a disturbance on the surface of the water with the emission of air bubbles and a popping sound simulative of the sound made by a striped bass finding and landing on its catch.

For this purpose I have provided a fishing plug which not only will float on the surface of the water, but which is provided with a flat face plate tending to cause the plug to dive or its nose to sink under water, with the fish plate so constructed, and the parts so counterbalanced that the buoyancy of the plug will counteract the diving action of the face plate so that the rear end of the plug will always remain above water and the plug will axially wiggle or pivot while partially rotating as it wiggles through the water in simulation of an injured fish and when a sharp pull is made on the line, the plug will jump and turn over on its back to cause the inverted face plate to churn up the surface of the water, with the emission of air bubbles, making a popping sound simulative of the sound made by the striped bass stunning and landing its catch.

To maintain this travel of the plug in the water, I preferably construct the body of the plug of a light material such as ponderosa pine or light wood or other light material having a specific gravity of about .45 and I so limit the weight of the fish plate, the hooks mounted thereon and hook mounting means to about 30.5% of the weight of the plug, so that the plug will function when pulled through the water in the manner explained.

I thus provide a plug that jumps and swims, wiggles in a rip and creates a commotion like a striped bass breaking or popping and which always remains on the surface to resemble the bait the bass likes to feed on and thus provide a bait which is easy to learn to use for it is always in sight and can always be made to act as a fisherman wants it to and which can also, like a puppet on a string, be made to splash like a striped bass breaking or popping or standing on end, jumping or struggling in the water like an injured fish.

A further object of my invention is to provide a novel type of swivel mounting for the axially spaced hooks on the plug. As stated, the striped bass is a fighting fish and tends to fight, twist and wiggle when attacking the bait. I first employed my improved plug with hooks which did not swivel and I found the striped bass would twist and wiggle free in two out of three cases. I have redesigned my improved plug with the specific type of swivelling hooks shown, with heavy swivels independently mounted on each hook and have found that I land about every fish that bites.

These and such other objects of my invention as may hereinafter appear will be best understood from a description of an embodiment thereof, such as is shown in the accompanying drawings, In the drawings, Fig. 1 is a plan view of a fishing plug constructed in accordance with my invention.

In the drawings, wherein like characters of reference generally indicate like parts throughout, 20 generally indicates a fishing plug, particularly adapted for striped bass, constructed in accordance with my invention.

Figure 1:
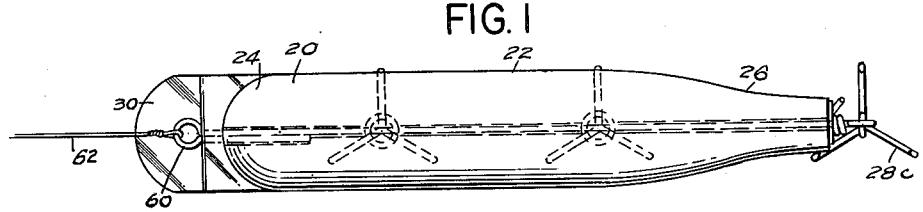
Figure 2:
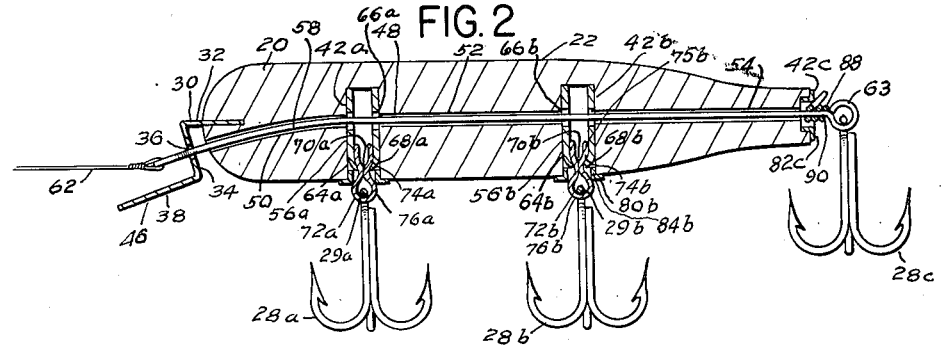
Fig. 2 is a central longitudinal, vertical, sectional view thereof.
Figure 3:
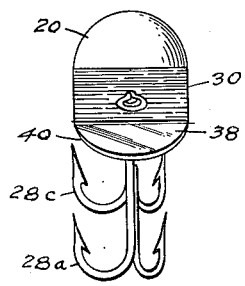
Fig. 3 is a front view thereof.
Figure 4:
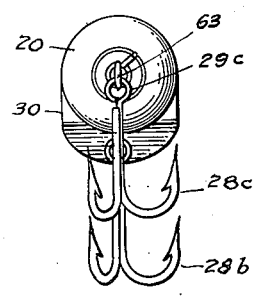
Fig. 4 is a rear view thereof.
Figure 5:
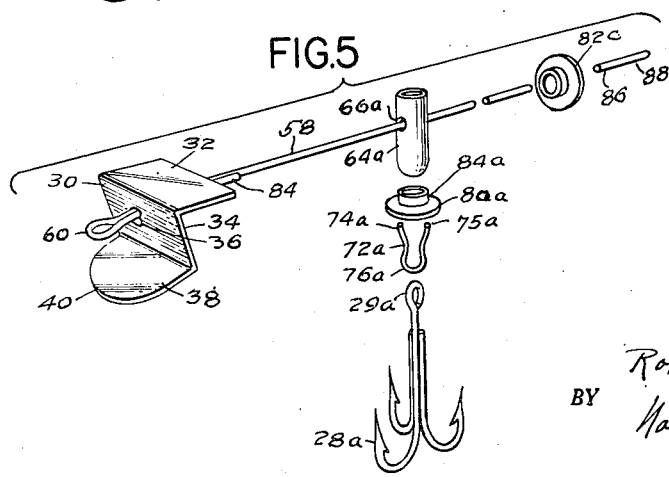
Fig. 5 is a diagrammatic perspective view illustrating the parts I preferably employ to maintain the fish hooks on the plug, prior to attachment thereto.

As stated hitherto, I preferably make my improved plug or lure 20 of a fish simulating shape and for this purpose provide it with the elongated, generally cylindrical fish simulating body 22, having a semi-spherical nose 24 and a tapered rear end 26. Suitable, preferably multipronged hooks as shown, are mounted at spaced axial distances on the plug, comprising the two hooks 28$^a$ and 28$^b$ depending from the body thereof and the hook 29$^c$, depending from the rear end thereof, said hooks 28$^a$ and 28$^b$ being preferably swivably mounted on said plug 20 in a manner to be explained.

In the preferred embodiment shown, said plug is provided with the face plate 30 to make it twist and wiggle and to aid in causing a commotion when the plug is pulled in inverted position through the water. In the preferred embodiment shown, said face plate 30 comprises a preferably flat face plate of at least the width of the plug, having a forwardly projecting portion 32, having its rear end embedded in a horizontal slot substantially centrally of the nose of the plug to have the portion 32 project first forwardly horizontally substantially centrally of the nose and a portion 34 projecting downwardly therefrom preferably having a hole 36 therein, said portion 34 terminating in the tip portion 38, having a semi-circular lower edge 40 extending obliquely forwardly and downwardly from said downwardly projecting portion 34.

As stated, I preferably so construct my improved plug that it may have its rear end float on the surface of the water and the plug will axially swivel or pivot while partially rotating as it wiggles through the water in simulation of an injured fish. For this purpose, I preferably construct the body of my plug of a light material, preferably a light wood such as ponderosa pine or like material having a specific gravity of about .45, although the plug may be constructed of other types of wood, plastic or any suitable material. I have found that the most suitable materials have a specific gravity between .4 and .5. As stated, the hooks 28$^a$, 28$^b$, and 28$^c$ are preferably mounted at spaced axial distances of the plug by the mounting means 42$^a$, 42$^b$, 42$^c$, with the hook 28$^c$ depending from the rear end of the plug and the hooks 28$^a$ and 28$^b$ depending at axially spaced intervals from the ends of the plug on said body. To achieve the desired result, the weight of the face plate 30, the hooks 28$^a$, 28$^b$ and 28$^c$ and the hook mounting means 42$^a$, 42$^b$ and 42$^c$, is less than 29% of the weight of the plug when the plug body is constructed of a material having a specific gravity around .5, and I preferably so construct my improved device that the weight of these parts bears this proportion to the entire weight of the plug. If, however, the specific gravity of the body drops to .4, the weight of said parts may be increased up to around 32%. With this construction and proportioning of weights, the buoyancy of the plug 20 is so balanced by said other parts and by the size and shape of the face plate 30, that as said plug is drawn in use the buoyancy of the plug itself will so counterbalance the diving tendency or action of the face plate that the rear end 26 of the plug will always remain above water and the plug will axially wiggle or pivot while partially rotating as it wiggles through the water in simulation of an injured fish, to the left, then back centrally through the mid position, to the right and so on back and forth as the plug is reeled in in use.

It is also apparent when there is a sharp pull on the line the plug 20 will jump and then fall as if landing on its bait or catch to create a disturbance on the surface of the water by the splash of the plug itself landing and by the inverted surface of the face plate contacting the surface of the water, with the emission of air bubbles and a popping sound simulative of the sound made by a striped bass landing bait.

My invention also specifically relates to the special type of mounting means 42$^a$, 42$^b$, and 42$^c$ I employ for pivotally mounting the body hooks 28$^a$ and 28$^b$ so that they may swivel as they depend from the lower portion of the plug. For this purpose, I provide the plug body with the central axial hole 48 extending from the lower portion of the nose 24 upwardly as at 50 through the nose and front portion of the body, then rearwardly centrally as at 52 of said body to the rear end 54 thereof. I also provide the vertical holes 56$^a$ and 56$^b$ projecting downwardly from said central axial hole 48 to the lower surface of said body and if desired said holes 56$^a$ and 56$^b$ to lighten the body may extend upwardly beyond said axial hole 48.

I provide the draw wire 58 extending through said face plate hole 36 when the face plate 30 is employed, and the central axial hole 48 of said plug having a front end shaped in the form of a line attaching loop 60 to which the line 62 is attached in front of the downwardly projecting portion 34 of said face plate and a rear end having a vertical hook attaching loop 63 thereon. The multipronged fish hook 28$^c$ has its eye 29$^c$ mounted on said vertical loop 63. To swivably maintain the centrally depending multipronged fish hooks 28$^a$ and 28$^b$ in their respective holes 56$^a$ and 56$^b$ I provide the hollow cylindrical barrels 64$^a$ and 64$^b$ mounted with a loose slip fit in said vertical holes 56$^a$ and 56$^b$, being provided with the diametric holes 66$^a$ and 66$^b$ in the upper ends thereof through which the supporting draw wire 58 is strung. Said barrels 64$^a$ and 64$^b$ are provided with the inwardly domed lower edges 68$^a$ and 68$^b$, having the open central portions 70$^a$ and 70$^b$ therein.

I provide the inverted cotter hooks 72$^a$ and 72$^b$ having outwardly flaring upper ends 74$^a$ and 74$^b$ extending through the narrow open portions 70$^a$ and 70$^b$ of said swivel barrels 64$^a$ and 64$^b$ and resting on the domed edges thereof so that the hook portions 76$^a$ and 76$^b$ depend from the lower surface of the plug. The fish hooks 28$^a$ and 28$^b$ have their respective eyes 29$^a$ and 29$^b$ pivotally mounted on the outwardly projecting loops 76$^a$ and 76$^b$ of said cotter hooks 72$^a$ and 72$^b$.

I also preferably provide the protective grommets 80$^a$ and 80$^b$, having the inwardly projecting cylindrical lips 84$^a$ and 84$^b$ adapted to fit with a forced fit within the lower ends of said holes 56ª and 56ᵇ and the outer annular portions 82ª and 82ᵇ covering the surface of the plug adjacent said holes. A similar grommet 80ᶜ is mounted over the rear end of the plug.

It is apparent that the construction of the mounting means permits a ready assembly of the parts. The grommets 80ª and 80ᵇ are first inserted in their respective holes 56ª and 56ᵇ and the grommet 80ᶜ inserted over the rear end 54 of said plug, the face plate 30 being also inserted at that time. The cotter hooks 72ª and 72ᵇ then have one leg thereof inserted through the eye 29ª or 29ᵇ of the fish hook 28ª or 28ᵇ and then have their legs 74ª or 74ᵇ compressed together so that they may be inserted upwardly within the lower end of the barrel 64ª or 64ᵇ. The lower end of the barrel 64ª or 64ᵇ is then domed with a suitable compressing tool so that the tips 75ª or 75ᵇ of the legs 74ª or 74ᵇ rest against the inwardly domed lower edges 68ª or 68ᵇ of the barrels 64ª or 64ᵇ.

The draw wire 58 then has its front end bent back on itself as at 84 to provide the loop 60 on the front end thereof and the draw wire 58 is then inserted through the face plate hole 36 when the face plate 30 is employed and rearwardly through the central axial hole 48, through the diametric holes 66ª and 66ᵇ of the barrels 64ª and 64ᵇ so that its rear end projects rearwardly through the grommet 80ᶜ beyond the rear end 26. The rearwardly projecting end 86 of the draw wire is then bent downwardly and rearwardly after the eye 29ᶜ has been inserted therein to provide the circular vertical loop 63 for pivotally mounting the fish hook eye 29ᶜ therein and the tip 88 of said wire is then wound in spiral formation around the portion 90 of the wire intermediate the rear end 26 of the plug and the vertical loop 63.

It is apparent that with this construction in use that when a fish bites on any of the prongs of any of the respective hooks 28ª or 28ᵇ that said hooks will swivel freely on said plug with the ends 75ª or 75ᵇ of the cotter hooks 72ª and 72ᵇ revolving on the inwardly projecting dome edges 68ª or 68ᵇ on the lower ends of the barrels 64ª or 64ᵇ. If desired, however, only one hook 28ª may be employed centrally with the hook 28ᵇ and its mounting means being omitted.

It is apparent that I have provided a novel type of fishing plug with the advantages described above.

It is understood that my invention is not limited to the specific embodiment shown and that various deviations may be made therefrom without departing from the spirit and scope of the appended claim.

What I claim is:

A fishing plug comprising a generally cylindrical body, a rounded nose section and a tapered rear end, said nose section having a central transverse slot, a face plate having a horizontal portion, a downwardly extending portion, and a forwardly extending lower tip portion, the horizontal portion being secured in the central transverse slot, said cylindrical body having an axial bore and said nose section having a downwardly extending bore communicating with the axial bore, said downwardly extending face plate portion having an opening aligned with the outer end of the downwardly extending bore, and a draw wire extending through said axial bore, said downwardly extending bore, and said opening in the downwardly extending face plate portion.

ROBERT B. POND.

REFERENCES CITED

The following references are of record in the file of this patent:

UNITED STATES PATENTS

| Number | Name | Date |
|---|---|---|
| 299,133 | Halkyard | May 27, 1884 |
| 923,095 | Wilcox | May 25, 1909 |
| 935,657 | Howe | Oct. 5, 1909 |
| 1,689,541 | Welch | Oct. 30, 1928 |
| 1,744,366 | Davenport | Jan. 21, 1930 |
| 1,809,776 | Davenport | June 9, 1931 |
| 1,842,591 | Dunkelberger | Jan. 26, 1932 |
| 2,152,275 | Parkins | Mar. 28, 1939 |
| 2,254,949 | Messacar | Sept. 2, 1941 |

FOREIGN PATENTS

| Number | Country | Date |
|---|---|---|
| 611,436 | Great Britain | Oct. 29, 1948 |